United States Patent [19]

Nicholls et al.

[11] Patent Number: 5,030,390
[45] Date of Patent: Jul. 9, 1991

[54] PROCESS FOR COOLING WATER IN AN INFLATED FABRIC COOLING DOME

[75] Inventors: Robert L. Nicholls; Efstathios Michaelides, both of Newark, Del.

[73] Assignee: University of Delaware, Newark, Del.

[21] Appl. No.: 382,461

[22] Filed: Jul. 20, 1989

[51] Int. Cl.⁵ .............................................. B01F 3/04
[52] U.S. Cl. ..................................... 261/100; 52/2.25
[58] Field of Search .............. 261/100, 105, 106, 107; 52/2 R, 2 P, 2 N, 2 E

[56] References Cited

U.S. PATENT DOCUMENTS

| | | | |
|---|---|---|---|
| 723,098 | 3/1903 | White | 261/106 |
| 797,615 | 8/1905 | Schmitt | 261/100 |
| 1,051,661 | 1/1913 | Anderson | 261/106 |
| 1,107,455 | 8/1914 | Sintz | 261/106 |
| 1,278,836 | 9/1918 | Bibbee | 261/106 |
| 2,812,769 | 11/1957 | Schaefer et al. | 52/2 E |
| 3,035,590 | 5/1962 | Helmers | 52/2 N |
| 4,750,733 | 6/1988 | Foth | 52/2 R |

FOREIGN PATENT DOCUMENTS

| | | |
|---|---|---|
| 2262954 | 6/1974 | Fed. Rep. of Germany . |
| 3202316 | 4/1983 | Fed. Rep. of Germany . |
| 3249612 | 3/1988 | Fed. Rep. of Germany . |
| 131943 | 8/1982 | Japan ................. 261/100 |
| 783428 | 11/1980 | U.S.S.R. . |

Primary Examiner—Tim Miles
Attorney, Agent, or Firm—Dean R. Rexford

[57] ABSTRACT

A relatively low first cost process for cooling a warm liquid usually water, with a gas, usually air, comprises inflating a fabric dome through which inflating gas passes, while warm liquid is passed over the dome thus causing intimate mixing of liquid and gas in and on the fabric and consequent efficient cooling.

11 Claims, 4 Drawing Sheets

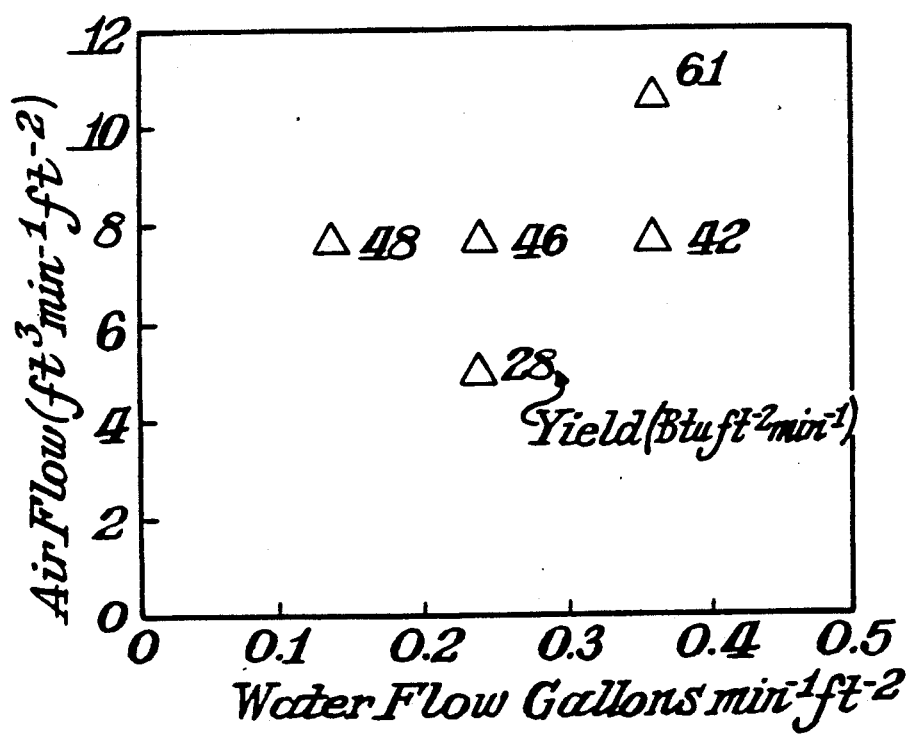

PROCESS FOR COOLING WATER IN AN INFLATED FABRIC COOLING DOME

BACKGROUND OF THE INVENTION

Field of the Invention and Related Art

This invention pertains to the cooling of liquids, especially water, and has particular reference to inflated upwardly convex domes such as those used to cover stadia and the like.

In industry, the cooling of water is an old process. Various means, most comprising contacting the water with air, are known. The simplest of these processes comprises allowing the warm water to stand in a pond. Improvement in cooling rate is accomplished by spraying the water into the air and allowing it to fall back into the pond.

Generally preferred, however, particularly in the power, chemical, and related industries where large amounts of heat are rejected, are cooling towers wherein water is sprayed into the tower near the top and allowed to fall through a rising stream of air.

Under the usual conditions of wet cooling tower operation, about 80% of the heat transfer is due to latent heat transfer derived from evaporation of a portion of the water and about 20% is due to sensible heat transfer due to the usual difference between the temperature of the water and that of the air.

Cooling towers, particularly the large hyperbolic towers common in the nuclear power industry, are characterized by very high first costs, especially in the cost of foundations to support the large reinforced concrete walls characteristic of such towers. There is a need for less expensive water-cooling means and it is an object of this invention to provide such means.

SUMMARY OF THE INVENTION

The process for cooling a liquid with a gas which comprises the steps
(a) applying said gas to the bottom side of a fabric at a pressure sufficient to inflate said fabric forming a dome having a lower periphery, said pressure being sufficient to cause said gas to pass, at least in part through said fabric;
(b) applying said liquid to the top of said dome; and
(c) recovering cooled liquid at the lower periphery of said fabric.

BRIEF DESCRIPTION OF THE DRAWINGS

FIG. 2A shows an enlarged section from FIG. 2.
FIG. 5 is a graph showing data similar to the data of FIGS. 3 and 4. derived from a model rectangular device.

DESCRIPTION OF THE PREFERRED EMBODIMENTS

Figure 1:
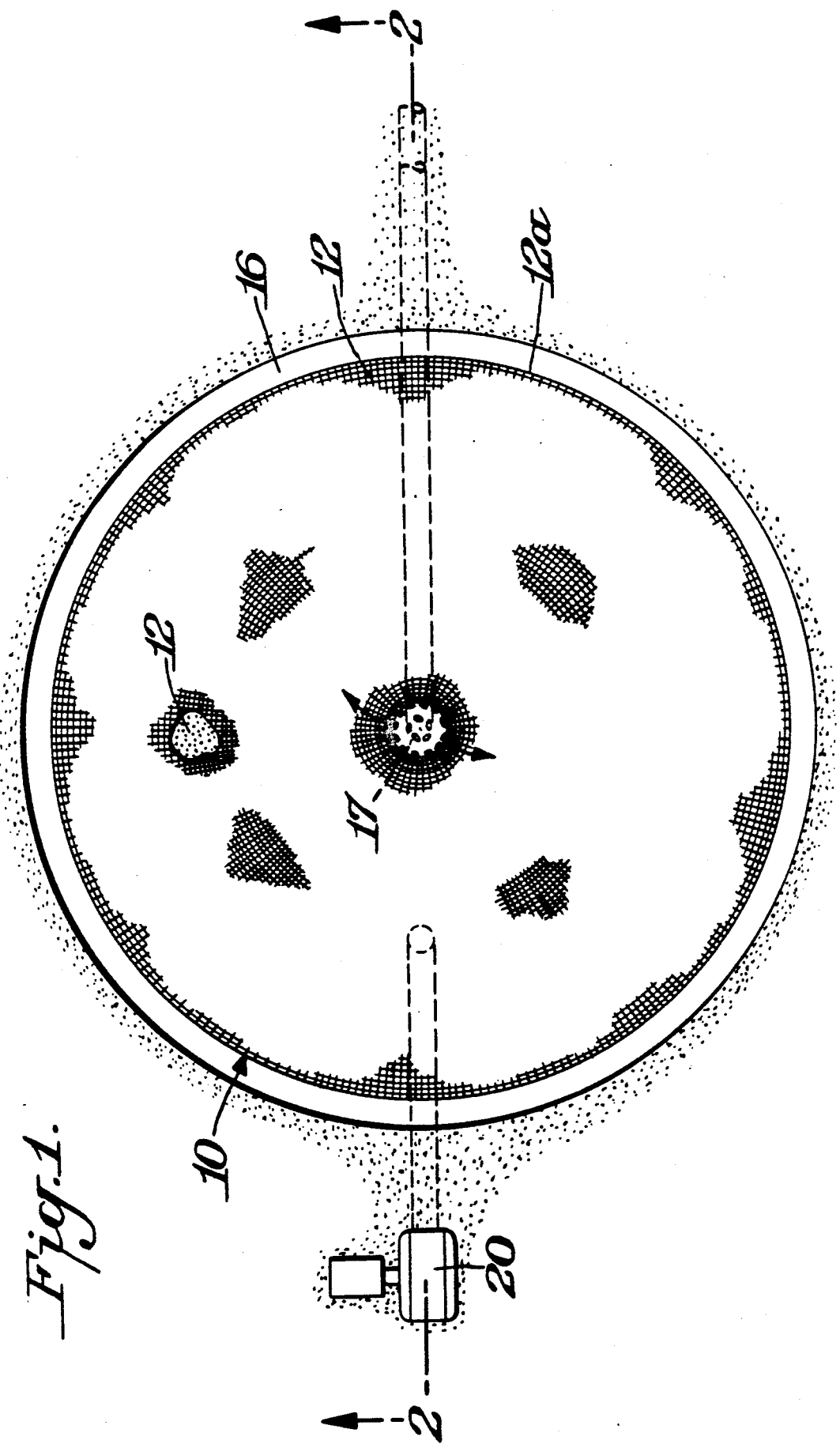
FIG. 1 is a plan view of the same dome assembly.

Before proceeding to a detailed description of the invention, it is useful to explain the meaning of the term 'fabric' as it is used herein. In the context of this invention, the term has a somewhat broader meaning than is usually ascribed. In the broadest sense, the term is intended to comprise porous materials having two principal dimensions and a thickness dimension much less than the other two. Porosity of the kind useful in this invention is found in woven and non-woven fabrics, thin felts and in needle punched fabrics and films, inter alia. Fabrics useful in this invention further possess sufficient tensile strength and resistance to water to permit at least limited draping, air inflation, and long term exposure to water. Preferred fabrics are relatively thick, hydrophilic and capable of wicking relatively large amounts of water. The artisan will seek suitable fabrics preferably among polyesters, polyamides, hydrophilic polypropylene and spun bonded polyethylene, inter alia.

Devices of the invention are best described by reference to FIGS. 1 and 2. Turning first to FIG. 2, reference number 10 represents an inflated dome and associated equipment comprising a fabric as described. The fabric is represented in FIG. 2A, enlarged section 11, by reference number 12. The fabric 12 may also comprise filter ridges 13 which are woven into, sewn, molded, or cemented to the fabric to create concentric rings of turbulence to improve water-air contact. Fabric 12 comprising a single layer is the minimum fabric requirement for operability in selected embodiments wherein a slight air pressure above atmospheric pressure is sufficient to inflate dome 10, prevent most of the wicked water from passing through the fabric, and cause at least some of the air to pass through the fabric. A plurality of layers in fabric 12 may be employed, although this is not preferred. Nevertheless, the term "fabric" as used herein is intended to comprise both a single layer and a plurality of layers. As will be evident in light of the following description, a balance must be struck by experiment between the porosity of the fabric and the pressure of the supporting air so as to thoroughly aerate water flowing over and through the fabric without bursting the inflated dome on the one hand or permitting gross amounts of water to flow through the fabric into the air space below the dome on the other.

It has been found, in some cases, that inflation and prevention of water flow-through is not achieved using a single fabric. Additional fabric layers may be employed, although it is normally preferred to employ a support layer 14 in this case. Layer 14 lying under fabric 12, need not be especially hydrophilic so long as it functions to restrain the air flow through the dome to a degree that the structure is inflated while, at the same time, permitting only a reasonable flow of air through the structure such that water in and on fabric 12 comes in intimate contact with the flowing air without being bubbled excessively out of the device. Layer 14 serves also to distribute the flow of air more or less evenly over the structure. The functions described can be provided in layer 14, for example by selection of a woven fabric having a weave tighter than that of layer 12, or a needle punched film or spun bonded fabric. Among the latter materials, "Tyvek" spun bonded polyethylene sold in several grades of porosity, some needle punched, by E. I. du Pont de Nemours & Co. of Wilmington, Del., is particularly well suited to this task. Like fabric 12, support layer 14 may comprise a plurality of materials.

The bottom peripheries, 12a and 14a respectively, of fabric 12 and support layer 14 are attached to concrete pad 15 along the inner side of gutter 16.

In operation, blower 20 and associated piping provides air to the dome at a rate sufficient to inflate the dome and provide sufficient pressure within the dome to force air through the dome. As a rule of thumb, a pressure, expressed as a column of water, must be at least about 1.5 times the thickness of the water on and in the fabric. An experiment is necessary to match the pressure and the structure of the fabric. Generally the pressure between 0.25 inches of water and 2.0 inches.

Warm water to be cooled is provided to the top of the dome by standpipe and sprayhead 17. Other means may be employed. In some cases a simple pipe might be employed, for example. The water is wicked up and distributed on and in layer 12. Optional filter ridges 13, if present, assist in the task. As the water flows in layer 12, air rising through the dome contacts the descending water most intimately; the air-water contact surfaces being probably several hundred times the nominal area of the dome. During this passage the air closely approaches saturation. The water, cooled as a result of latent heat and sensible heat exchange with the air, collects in gutter 16 at the lower periphery of the dome and is returned to a process outside the invention. Means not shown return water adventitiously collected on concrete pad 15 to the process stream.

Figure 2:
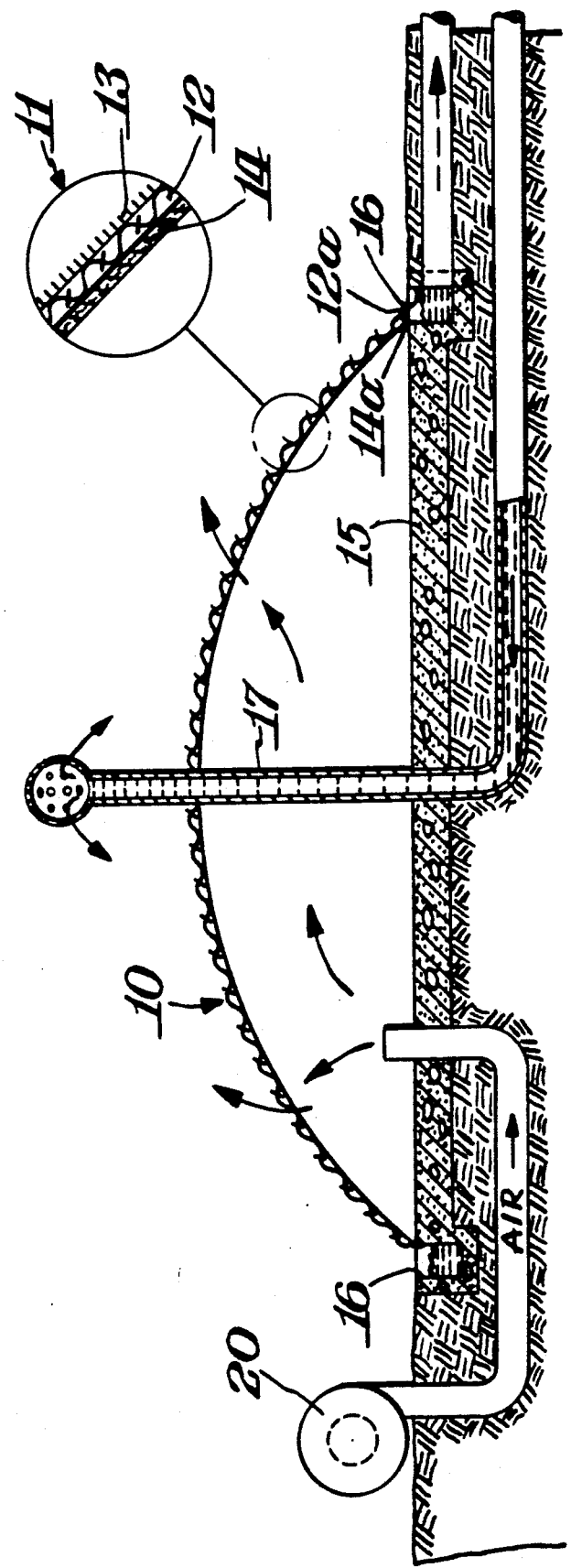
FIG. 2 is an elevation cross section of a dome assembly of the invention taken at plane 2—2 in FIG. 1.

FIG. 1 shows the plan arrangement of components as seen from above.

Although circular domes are illustrated in drawings, other shapes are contemplated such as squares, rectangles, triangles, ellipses and other shapes which might be advantageous in particular circumstances.

EXAMPLES

Two model devices were constructed for establishing approximate optimum conditions.

EXAMPLE 1

A first model device, herein referred to as the rectangular test apparatus, exposed a 1.5×36 in. sample of fabric to heat exchange conditions as they might be encountered in a full scale device. The long narrow shape of the fabric sample was selected to minimize possible uneven distribution of water.

Figure 3:
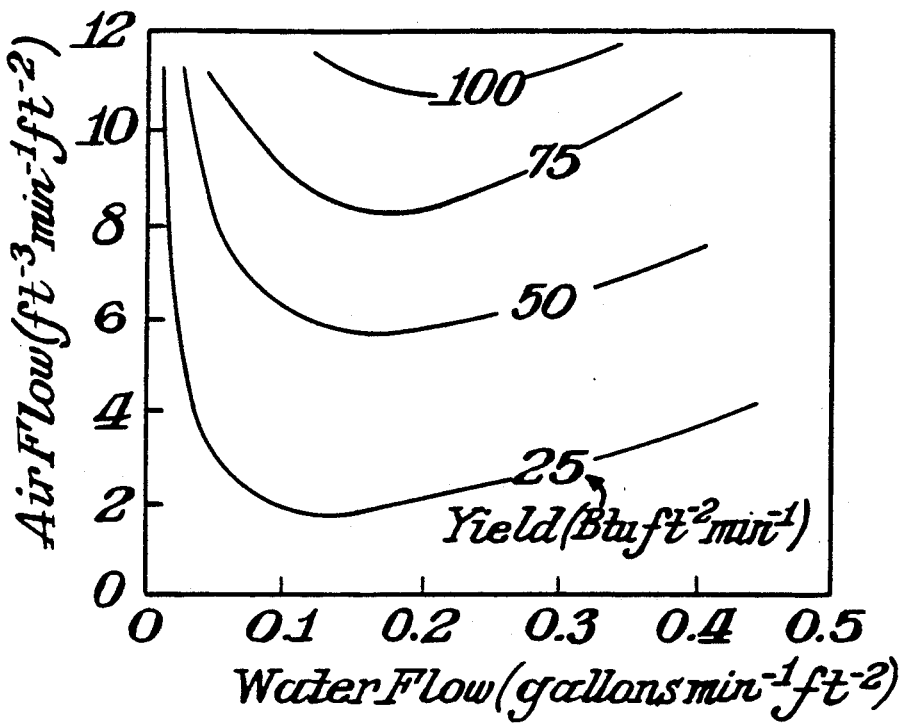
FIG. 3 is a graph relating, in a model rectangular testing device, water flow and air flow to heat rejection yield. Contour lines join points of equal yield expressed as Btu/min per ft$^2$ of surface.
Figure 4:
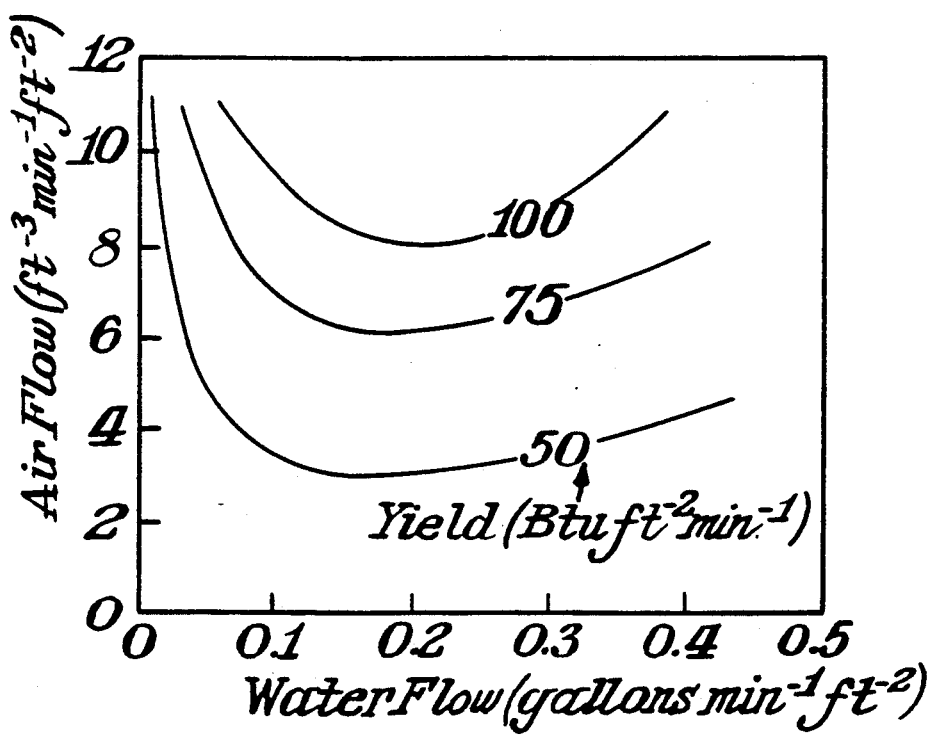
FIG. 4 is a graph similar to that of FIG. 3 wherein fabric 10 comprises three layers (versus one in FIG. 3).

Warm water was applied to a raised end of the fabric and allowed to flow to the other end, and away from the fabric while air, slightly above atmospheric pressure, was admitted to a closed space under the fabric. Conventional means were provided for controlling and measuring or estimating variables, as follows:

1. Temperature and flow rate of water entering and leaving the fabric;
2. Flow rate of air entering the space under the fabric;
3. Air pressure under the fabric; and
4. Average angle of the fabric to horizontal;

A representative experiment was carried out as follows. The fabric, inclined at 22 deg from horizontal, was a single layer of 2.5 oz yd$^{-2}$, 15 and 32 denier blend of high loft (i.e. flannel-like) polyester. Water at 122 deg F was provided to the upper end of the fabric sample at the rate of 0.25 gpm (gallons per minute) /ft.$^2$. Air was provided to the underside of the fabric at the rate of 11.0 cfm (cubic feet per minute) /ft$^2$ which resulted in a pressure on the underside of the fabric of 1.5 inches of water. Leaving the fabric at steady state was 102 deg F water at the rate of 11.6 oz/min. Heat rejection yield was calculated from the above data, as follows:

Sensible heat transfer:
    (122−102)(11.6 oz/min)(1 lb/16 oz)(1 Btu/°-lb) = 14.5 Btu
Latent heat transfer:
    (12−11.6 oz/min)(1 lb/16 oz)(972 Btu/lb) = 24.3 Btu
                                                Total 38.8 Btu
(38.8 Btu/min)/0.375 ft$^2$ of fabric) = 103.5 Btu/min-ft$^2$ Similar experiments produced data for plotting FIG. 3. The data for FIG. 4 was produced in the same equipment using three layers of the fabric used in the experiment of FIG. 3. It was observed in the above-described apparatus that at under-dome air pressures of less than 0.15 inches of water, fabric slope below about 10 deg, and water flow rates above about 14 oz per minute resulted in water leaking through the fabric into the under-dome space.

On reducing the slope from 22 deg to 13.5 deg it was observed that the heat rejection yield increased, presumably due to increased retention time, from 74 to 101 Btu/ft$^2$-min at 8 cubic feet of air per second and 0.2 gallons per ft$^2$-minute.

EXAMPLE 2

A model 3-foot diameter circular dome test device similar to that shown in FIGS. 1 and 2 was assembled with means for measuring or controlling the same variables as in Example 1. The dome assembly consisted from bottom to top of layer 14 and fabric 12, wherein layer 14 consisted of "Tyvek" spunbonded polyethylene housewrap and thereon a film of needle punched polypropylene film to better distribute the air; Fabric 12 consisted of one layer of high loft (i.e. flannel-like) polyester cloth. In this experiment a film of polyethylene covered the dome except at and near the apex so as to permit entrance of warm water. This arrangement is not preferred.

The experiment was carried out at a rise/span ratio of about 1/9, giving a radial-average dome slope of about 12.5 deg. Variables were fixed in three experiments as follows:
    Water inlet temperature: 123 deg F
    Water loadings: 0.13, 0.24, and 0.36 gpm/ft$^2$
    Air flow rates: 4.9, 7.7, and 10.6 cfm/ft$^2$ (Corresponding under-dome pressures: ca. 0.5, 0.96, 1.3 in. water)

The results of five experiments, carried out in essentially the same manner as in the previous example, are shown in FIG. 5. It will be noted that the yield of rejected heat is somewhat less than in Example 1, presumably because of less even distribution of water. Nevertheless, the circular dome is preferred over the rectangular and other embodiments.

It is estimated that the first cost of a dome of the invention is about one-fifth that of a comparable conventional cooling tower. The operating cost of the invention dome is about 2.5 times that of the conventional tower and its land use efficiency is about one-tenth that of the conventional tower. Thus the cooling dome of the invention is to be favored where land is inexpensive and/or where first cost is controlling.

Having now disclosed our invention, we claim:

1. The process for cooling a liquid with a gas which comprises the steps of:
    (a) applying said gas to the bottom side of a fabric at a pressure sufficient to inflate said fabric forming a dome having a lower periphery, said pressure being sufficient to cause said gas to pass, at least in part, through said fabric;

(b) applying said liquid from a process outside the invention to the top of said dome; and (c) recovering cooled liquid at the lower periphery of said dome and returning said cooled liquid to said process outside the invention.

2. The process of claim 1 wherein the liquid is water and the gas is air.

3. The process of claim 2 wherein said liquid is applied by spraying.

4. The process of claim 2 wherein air is provided to the underside of said fabric at rates resulting in under-dome pressures of about 0.25 to about inches of water.

5. The process of claim 4 wherein the under-dome pressure is about 1.5 inches of water.

6. The process of claim 2 wherein said gas is applied to the bottom side of a combination of a fabric and a support layer lying under said fabric.

7. The process of claim 6 wherein the liquid is water and the gas is air.

8. The process of claim 7 wherein said liquid is applied by spraying.

9. The process of claim 7 wherein air is provided to the underside of said fabric at rates resulting in under-dome pressures of about 0.25 to about 2 inches of water.

10. The process of claim 7 wherein the under-dome pressure is about 1.5 inches of water.

11. The process of claim 7 wherein said gas is applied to the bottom side of a combination of a fabric and a support layer lying under said fabric.

* * * * *